US010676569B2

(12) United States Patent
Clauss et al.

(10) Patent No.: US 10,676,569 B2
(45) Date of Patent: Jun. 9, 2020

(54) METHOD FOR CONTINUOUSLY PRODUCING POLYAMIDE OLIGOMERS AND PRODUCING SEMICRYSTALLINE OR AMORPHOUS POLYAMIDES THAT CAN BE THERMOPLASTICALLY PROCESSED

(71) Applicant: BASF SE, Ludwigshafen (DE)

(72) Inventors: Joachim Clauss, Darmstadt (DE); Stefan Schwiegk, Neustadt (DE); Gad Kory, Gaiberg (DE); Christian Schmidt, Ludwigshafen (DE); Axel Wilms, Frankenthal (DE); Florian Richter, Mannheim (DE); Ning Zhu, Mannheim (DE); Silke Biedasek, Ludwigshafen (DE); Isa Alexandra Queiroz Da Fonseca, Ludwigshafen (DE); Heinrich Sack, Hassloch (DE); Arnold Schneller, Seeheim-Jugenheim (DE); Achim Stammer, Freinsheim (DE); Volker Rauschenberger, Eisenberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/896,780

(22) PCT Filed: Jun. 11, 2014

(86) PCT No.: PCT/EP2014/062103
§ 371 (c)(1),
(2) Date: Dec. 8, 2015

(87) PCT Pub. No.: WO2014/198757
PCT Pub. Date: Dec. 18, 2014

(65) Prior Publication Data
US 2016/0130397 A1 May 12, 2016

(30) Foreign Application Priority Data

Jun. 12, 2013 (EP) .................................... 13171652

(51) Int. Cl.
*C08G 69/28* (2006.01)
*C08G 69/30* (2006.01)

(52) U.S. Cl.
CPC ............. *C08G 69/30* (2013.01); *C08G 69/28* (2013.01)

(58) Field of Classification Search
CPC ......... C08G 69/28; C08G 69/30; C08G 69/46
See application file for complete search history.

(56) References Cited

U.S. PATENT DOCUMENTS

| 3,900,450 A | 8/1975 | Jaswal et al. | |
| 4,540,772 A * | 9/1985 | Pipper | C08G 69/28 526/68 |
| 4,831,108 A | 5/1989 | Richardson et al. | |
| 4,963,646 A | 10/1990 | Galland et al. | |
| 5,053,259 A * | 10/1991 | Vicik | B32B 27/34 428/36.91 |
| 5,098,940 A | 3/1992 | Brooks | |
| 5,418,068 A | 5/1995 | Caluori et al. | |
| 5,708,125 A * | 1/1998 | Liedloff | C08G 69/28 525/420 |
| 6,069,228 A * | 5/2000 | Alsop | C08G 69/04 528/310 |
| 6,107,449 A | 8/2000 | Wiltzer et al. | |
| 2003/0045618 A1* | 3/2003 | Koshida | B23K 26/18 524/358 |
| 2006/0122360 A1* | 6/2006 | Tsujii | C08G 69/04 528/310 |

FOREIGN PATENT DOCUMENTS

| CA | 2153862 A1 | 1/1996 |
| DE | 41 42 978 C1 | 12/1992 |
| EP | 0123377 A2 | 10/1984 |
| EP | 0 410 649 A1 | 1/1991 |
| EP | 0 693 515 A1 | 1/1996 |
| JP | S59155433 A | 9/1984 |
| JP | 2000-510892 A | 8/2000 |
| JP | 2010-116575 A | 5/2010 |
| WO | WO-2004/055084 A2 | 7/2004 |

* cited by examiner

*Primary Examiner* — Gregory Listvoyb
(74) *Attorney, Agent, or Firm* — Marshall, Gerstein & Borun LLP

(57) ABSTRACT

The invention relates to a process for continuously preparing polyamide oligomers. This comprises continuous conveying of an aqueous solution of polyamide-forming monomers from a reservoir vessel into an oligomerization reactor, heating of the aqueous solution beyond a dissolution or storage temperature, the residence time of the monomer solution in the oligomerization reactor being limited and the pressure or the partial vapor pressure of the water being adjusted such that a conversion of monomers to polyamide oligomers does not exceed a maximum value and/or the polyamide oligomers formed do not phase-separate or spontaneously crystallize in solid form, and continuous discharge of the polyamide oligomers from the oligomerization reactor. A polyamide oligomer preparable by this process can be provided continuously in a mixture with water in a process for preparing a semicrystalline or amorphous, thermoplastically processible polyamide and then postcondensed to give a polyamide. This polyamide can be used for production of moldings by means of injection molding, multicomponent injection molding, injection molding/welding, extrusion, coextrusion, blow molding or thermoforming.

24 Claims, No Drawings

METHOD FOR CONTINUOUSLY PRODUCING POLYAMIDE OLIGOMERS AND PRODUCING SEMICRYSTALLINE OR AMORPHOUS POLYAMIDES THAT CAN BE THERMOPLASTICALLY PROCESSED

CROSS-REFERENCE TO RELATED APPLICATIONS

This is the U.S. national phase of International Application No. PCT/EP2014/062103, filed Jun. 11, 2014, which claims the benefit of European Patent application No. 13171652.4, filed Jun. 12, 2013.

BACKGROUND OF THE INVENTION

The present invention relates to a process for continuously preparing polyamide oligomers and to a polyamide oligomer preparable in this process. The invention further relates to a process for preparing semicrystalline or amorphous, thermoplastically processible polyamides from this polyamide oligomer, and also to a polyamide preparable by this process and to the use thereof.

STATE OF THE ART

Semiaromatic polyamides having terephthalamide or isophthalamide units have long been known and have become established on the market particularly as copolyamides.

The preparation of semicrystalline or amorphous semiaromatic polyamides, in contrast, is always a technical challenge, one reason for which is that the water balance of the reaction mixture and the associated temperature and pressure control as a function of time and the stoichiometric demands are not trivial. Associated with this are comparatively high and in some cases extreme demands on the process and the equipment or plants needed therefor.

In the case of semicrystalline semiaromatic polyamides, temperature control is of particular significance, since, on the one hand, side reactions occur at the relatively high temperatures often needed, and, on the other hand, the reaction mixture or portions thereof can nevertheless occur as solids. The melting or solidification point of a reaction mixture additionally varies as a function of the degree of conversion and may, for example in the case of block formation at the oligomer stage, be above that of a relatively high molecular weight polyamide with random distribution. Water or other small molecules can intervene here as solvents or act as melting point depressants. The results of side reactions may include branching and/or crosslinking and/or alterations of stoichiometric relevance.

In the case of amorphous semiaromatic polyamides, the situation is more favorable, since the reaction mixtures solidify only at much lower temperatures than typically used to conduct the reaction, and hence lower demands in practical terms have to be made on process and equipment.

Semicrystalline or amorphous semiaromatic polyamides are generally prepared over several process steps. In the first step, the monomers used (diamines, dicarboxylic acids or derivatives thereof, aminocarboxylic acids or lactam derivatives thereof) are typically converted in the presence of water to a fluid salt solution or dispersion, the composition of which corresponds nearly or exactly to stoichiometric equivalence of amino and carboxyl groups. This dissolution or neutralization step is generally effected batchwise in a conventional stirred tank. This has the advantage that the composition of the monomer mixture can be controlled by the use of simple acid-base titration methods and can optionally be adjusted to the particular preset ratio of amine and carboxyl groups by addition of the missing proportion of amine or acid.

The dissolution or neutralization step may be followed by the preparation of a precondensate or oligomer, before higher molecular weight semiaromatic polyamides are optionally obtained in downstream reaction steps.

For instance, EP 0 693 515 B1 discloses a process for preparing precondensates of semiaromatic polyamides or copolyamides, which makes use of the basic advantages of a batchwise operation. The batchwise performance of the process is regarded as critical to the success of the process. A multistage batchwise operation is described, which comprises a salt formation stage in a stirrable and inertizable autoclave, a reaction phase in an autoclave which is connected to a steam generator but need not necessarily be the same as that for the first phase, a steady-state phase which is to be maintained for at least 10 minutes, a transfer of the precondensates to a downstream process stage wherein the temperature of the reactor contents at a given lower steam pressure remains below the melting point or must not exceed 265° C., and a discharge phase. The precondensate thus obtained can be supplied in molten or solid form to a final reaction apparatus. Precondensate batches under a pressure of at least 1.6 MPa of semicrystalline polyamides or copolyamides having a melting point of 280° C. or higher can be obtained in the form of solid particles by spraying into an inertized cyclone or spray tower or a comparable unit, optionally dried and/or comminuted and, after remelting, fed into the final reaction apparatus with a suitable metering and conveying unit. Only with regard to this final reaction apparatus, for which no detailed description is given, is it mentioned that this apparatus can also work continuously, without any more specific details thereof.

DE 41 42 978 describes a multilayer composite system for reusable packaging materials composed of at least one copolyamide protective layer and at least one copolyamide barrier layer, wherein the copolyamides used are prepared batchwise.

WO 2004/055084 describes semicrystalline, thermoplastically processible, semiaromatic copolyamides preparable by condensation of at least the following monomers or precondensates thereof: a) terephthalic acid, b) at least one dimerized fatty acid having up to 44 carbon atoms and c) at least one aliphatic diamine of the formula $H_2N-(CH_2)_x-NH_2$ in which x is an integer of 4-18. There is no description of a continuous process for preparing these copolyamides.

Batchwise operations generally have the advantage that product switching can be undertaken very rapidly and without any great complexity. In contrast to fully continuous processes, they have the advantage that they allow a high degree of flexibility, but they are subject to restrictions in relation to the mean molar masses attainable. Because of the usually very high structure-related melt viscosities of such semiaromatic polyamides, the polycondensation thereof has to be stopped at a very early stage in order to be able to discharge the melt from a batch autoclave and process it.

The restriction of the mean molar mass of these semiaromatic polyamides to comparatively low values has an unfavorable effect on their mechanical and processing properties and other application-relevant properties.

Batchwise operations have the intrinsic disadvantage that startup and shutdown operations and introduction and discharge of materials do not constitute an equilibrium state in terms of plant technology, and homogeneous product quality can therefore be ensured only with difficulty. In addition, plants for batchwise operations have the disadvantage that their economies of scale are low when they are scaled up to higher throughputs. Furthermore, experience has shown that it is a disadvantage of batchwise operations that they have to be conducted with a relatively high staffing level and they can therefore often barely compete with continuous operations in terms of their economic viability.

In the meantime, there have been numerous attempts to get round these difficulties. Known proposals comprise the employment of two-stage processes with batchwise or continuous precondensate or prepolymer preparation and a final reaction stage to give the finished polymer.

EP 0 410 649 and U.S. Pat. No. 4,963,646 describe processes which get round some of the problems mentioned. However, these processes are difficult to implement in that two components have to be supplied to an extruder in exact ratios determined by the stoichiometry, and this extruder, as well as the homogeneous mixing of the two components, also has to undertake the reaction thereof with devolatilization. This is virtually unachievable for economically acceptable, relatively short residence times in conventional extruders.

U.S. Pat. Nos. 4,831,108 A and 5,098,940 A each disclose a complex, continuous process involving tubular reactor(s), a "dispersion phase" of steam-dispersed polymer and involving extruder(s).

It is therefore an object of the invention to provide a process for preparing precondensates or oligomers of semicrystalline or amorphous, thermoplastically processible, semiaromatic polyamides, which does not have the disadvantages of a batchwise operation. It is a further object of the invention to provide a process for converting the oligomers to higher molecular weight polyamides suitable for preparation of thermoplastically processible molding compositions.

It has now been found that, surprisingly, this object is achieved when, in a continuous process, an aqueous solution of polyamide-forming monomers is heated beyond a dissolution or storage temperature, the residence time of the monomer salt solution in the oligomerization reactor being limited and the pressure or the partial vapor pressure of the water being adjusted such that a conversion of monomers to polyamide oligomers does not exceed a maximum value and/or the polyamide oligomers formed do not phase-separate or spontaneously crystallize in solid form.

SUMMARY OF THE INVENTION

The invention therefore provides a process for continuously preparing polyamide oligomers. This comprises continuous conveying of an aqueous solution of polyamide-forming monomers from a reservoir vessel into an oligomerization reactor, heating of the aqueous solution beyond a dissolution or storage temperature, the residence time of the monomer solution in the oligomerization reactor being limited and the pressure or the partial vapor pressure of the water being adjusted such that a conversion of monomers to polyamide oligomers does not exceed a maximum value and/or the polyamide oligomers formed do not phase-separate or spontaneously crystallize in solid form, and continuous discharge of the polyamide oligomers from the oligomerization reactor. It enables the continuous preparation of polyamide oligomers, such that the typical disadvantages of a batchwise process, such as limitation of the batch size, loss of time resulting from filling, emptying and cleaning of the reaction vessel and tendency for deposits to form on the inner wall of the reaction vessel, are avoided.

A polyamide oligomer producible by means of this process features high constancy of quality and a narrow molar mass distribution.

The invention further provides a process in which, proceeding from the polyamide oligomer, higher molecular weight, semicrystalline or amorphous, thermoplastically processible polyamides are prepared. The process comprises continuous provision of a mixture comprising water and the polyamide oligomer and postcondensation of the polyamide oligomer to give a polyamide.

The invention further provides for the use of a semiaromatic polyamide obtainable by a process as defined above and hereinafter, preferably for production of electrical and electronic components and for high-temperature automotive applications.

The invention further provides for the use of an aliphatic polyamide obtainable by a process as defined above and hereinafter for production of films, monofilaments, fibers, yarns or textile fabrics.

DETAILED DESCRIPTION OF THE INVENTION

The term "polyamides" hereinafter encompasses homo- and copolyamides. The polyamides are designated in the context of the invention using abbreviations, some of which are customary in the art, which consist of the letters PA followed by numbers and letters. Some of these abbreviations are defined in DIN EN ISO 1043-1. Polyamides which can be derived from aminocarboxylic acids of the $H_2N$—$(CH_2)_z$—$COOH$ type or the corresponding lactams are identified as PA Z where Z denotes the number of carbon atoms in the monomer. For example, PA 6 represents the polymer of ε-caprolactam or of ε-aminocaproic acid. Polyamides derivable from diamines and dicarboxylic acids of the $H_2N$—$(CH_2)_x$—$NH_2$ and $HOOC$—$(CH_2)_y$—$COOH$ types are identified as PA xy where x denotes the number of carbon atoms in the diamine and y the number of carbon atoms in the dicarboxylic acid. Copolyamides are designated by listing the components in the sequence of their proportions, separated by slashes. For example, PA 66/610 is the copolyamide of hexamethylenediamine, adipic acid and sebacic acid. For the monomers having an aromatic or cycloaliphatic group which are used in accordance with the invention, the following letter abbreviations are used: T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine).

Hereinafter, the expression "$C_1$-$C_4$-alkyl" comprises unsubstituted straight-chain and branched $C_1$-$C_4$-alkyl groups. Examples of $C_1$-$C_4$-alkyl groups are especially methyl, ethyl, propyl, isopropyl, n-butyl, isobutyl, sec-butyl and tert-butyl (1,1-dimethylethyl).

In the aromatic dicarboxylic acids, aliphatic dicarboxylic acids, cycloaliphatic dicarboxylic acids and monocarboxylic acids mentioned hereinafter, the carboxyl groups may each be present in underivatized form or in the form of derivatives. In the case of dicarboxylic acids, neither carboxyl group, one carboxyl group or both carboxyl groups may be in the form of a derivative. Suitable derivatives are anhydrides, esters, acid chlorides, nitriles and isocyanates. Preferred derivatives are anhydrides or esters. Anhydrides of dicarboxylic acids may be in monomeric or in polymeric form. Preferred esters are alkyl esters and vinyl esters, more preferably $C_1$-$C_4$-alkyl esters, most preferably the methyl esters or ethyl esters. Dicarboxylic acids are preferably in the form of mono- or dialkyl esters, more preferably in the form of mono- or di-$C_1$-$C_4$-alkyl esters, most preferably in the form of monomethyl esters, dimethyl esters, monoethyl esters or diethyl esters. Dicarboxylic acids are additionally preferably in the form of mono- or divinyl esters. Dicarboxylic acids are additionally preferably in the form of mixed esters, more preferably in the form of mixed esters with different $C_1$-$C_4$-alkyl components, most preferably in the form of methyl ethyl esters.

The polyamides preparable by the process according to the invention can firstly be described in terms of the units into which the polymer decomposes, on the assumption of full hydrolysis of the amide groups. Hereinafter, in the definition of the units of the general formula (I) thus obtained, it is assumed that only amide groups are hydrolytically cleaved. Esters and amidine groups remain unhydrolyzed. This definition of the polyamides is not identical to the alternative definition specified hereinafter in terms of the monomers used, since structures formed by side reactions cannot be described adequately in the latter case.

Preferably, polyamides preparable by the process according to the invention, in the case of exclusive hydrolytic splitting of the amide groups, give rise to a composition of the following formula (I)

$$A1_{a1}|B1_{b1}|A2_{a2}|B2_{b2}|B3_{b3}|AX_{ax}|BY_{by}|AB_{ab}|A2B_{a2b}|AXBY_{axby} \quad (I)$$

in which
A1 denotes units which derive from unsubstituted or substituted monocarboxylic acids or derivatives thereof,
A2 denotes units which derive from unsubstituted or substituted dicarboxylic acids or derivatives thereof,
AX denotes units which derive from compounds having a carboxyl functionality greater than two,
B1 denotes units which derive from monofunctional amines,
B2 denotes units which derive from diamines,
B3 denotes units which derive from triamines,
BY denotes units which derive from compounds having an amino functionality greater than three,
AB denotes units which derive from aminocarboxylic acids,
A2B denotes units which derive from aminodicarboxylic acids,
AXBY denotes units which derive from compounds having amino and carboxyl groups where the functionalities X+Y are greater than 2,
with the proviso that the sum of all indices a1+b1+a2+b2+b3+ax+by+ab+a2b+axby adds up to 100 mol %.

The composition of the copolyamides in terms of molecular base units comprises mono-, di- or polycarboxylic acids, mono-, di-, tri- or polyamines, and optionally bi- or polyfunctional aminocarboxylic acids. In the context of this invention, "A" is used for molecular base units which derive from acidic carboxyl groups as functional groups, and "B" for those which derive from basic amino groups as functional groups. In the context of the invention, in the case of the amino groups B, no distinction is made between primary (NH2) or secondary (NH) amines.

With regard to suitable and preferred monocarboxylic acids from which the units A1 derive, reference is made to the monocarboxylic acids E) specified hereinafter. With regard to suitable and preferred unsubstituted or substituted dicarboxylic acids or derivatives thereof from which the units A2 derive, reference is made to the dicarboxylic acids A) and C) and derivatives thereof specified hereinafter. With regard to suitable and preferred compounds having a carboxyl functionality greater than two, from which the units AX derive, reference is made to the compounds K) specified hereinafter. With regard to suitable and preferred monofunctional amines from which the units B1 derive, reference is made to the monoamines F) specified hereinafter. With regard to suitable and preferred diamines from which the units B1 derive, reference is made to the diamines B) and D) specified hereinafter. With regard to suitable and preferred triamines from which the units B3 derive, reference is made to the triamines G) specified hereinafter. With regard to suitable and preferred higher than trifunctional amines from which the units BY derive, reference is made to the higher-functionality amines G) specified hereinafter. With regard to suitable and preferred higher aminocarboxylic acids from which the units AB derive, reference is made to the aminocarboxylic acids I) and lactams H) specified hereinafter. With regard to suitable and preferred aminodicarboxylic acids from which the units A2B derive, and higher-functionality compounds from which the units AXBY derive, reference is made to the compounds K) specified hereinafter.

In order to describe conversion, end group and stoichiometry aspects of an inventive semiaromatic polyamide, functionalization indices are introduced. In this context, the molar proportion of each fragment is weighted with the respective functionalities to be balanced. By definition, the acid index $n_{funct.A}$ is $a1+2a2+F_{ax.ax}ax+ab+2a2b+F_{ax.axby}axby=n_{funct.A}$ and the amine index $n_{funct.B}$ $b1+2b2+3b3+F_{by.by}by+ab+a2b+F_{by.axby}axby=n_{funct.B}$, using the mean functionalities F of the groups relevant in each case as prefactors for each of AX, BY and AXBY, which may of course themselves be a mixture of different species, where

$$F_{ax,ax} = \frac{\sum_j n_{AX,j} f_{AX,j}}{\sum_j n_{AX,j}}, \quad F_{ax,axby} = \frac{\sum_j n_{AXBY,j} f_{AX,ABXBY,j}}{\sum_j n_{AXBY,j}},$$

$$F_{by,by} = \frac{\sum_j n_{BY,j} f_{BY,j}}{\sum_j n_{BY,j}}, \quad F_{by,axby} = \frac{\sum_j n_{AXBY,j} f_{BY,AXBY,j}}{\sum_j n_{AXBY,j}}.$$

$n_{Ax}$, $n_{BY}$ and $n_{AXBY}$ represent the molar proportion of the respective fragment, j is the running variable which consecutively numbers the individual fragments and runs through integer values from 1 up to the number of different fragment species, $f_{AX}$ indicates the carboxyl group functionality of the respective fragments AX, $f_{BY}$ indicates the amino group functionality of the respective fragments BY, and $f_{AX.AXBY}$ indicates the carboxyl group functionality and $f_{BY.AXBY}$ the amino group functionality of the respective fragments AXBY. Analogously, it is also possible to define a generalized functionality $f_{A+B}$ for each species or else for the molar-weighted mixture in which amino and carboxyl groups are considered together for any particular species.

In that case, for a stoichiometric polycondensation product, $n_{funct.A}=n_{funct.B}$, and the mole fractions x of the carboxyl and amino groups both assume the value of 0.5, where $$X_A = \frac{n_{funct,A}}{n_{funct,A} + n_{funct,B}} \text{ and } X_B = 1 - X_A = \frac{n_{funct,B}}{n_{funct,A} + n_{funct,B}}.$$

However, inventive semiaromatic copolyamides can also be obtained in the case of a certain deviation from stoichiometry. Particularly when species of the functionalities $f_{A+B}>2$ are present in the mixture, it may be in accordance with the invention and advantageous to deviate from stoichiometry, to undertake a restriction in conversion in the course of increasing the molar mass and/or to use monofunctional species where $f_{A+B}=1$ to a controlled extent.

The inventive copolyamides can be realized in several advantageous forms. This means that, in principle, any of the above-described molecular base units may comprise none of, one of or any number of different molecular species. For example, in a polyamide, the diacid component A2 may consist of a particular proportion of terephthalic acid, another proportion of isophthalic acid and a further proportion of adipic acid. In addition, for example, the monoacid component A1 may consist of a particular proportion of propionic acid and a small proportion of dicarboxylic acid decarboxylated in a side reaction.

In order to describe the composition of the inventive semiaromatic copolyamides with regard to the exact chemical configuration too, the general formula $PA\text{-}A1_{a1}|B1_{b1}|A2_{a2}|B2_{b2}|B3_{b3}|AX_{ax}|BY_{by}|AB_{ab}|A2B_{a2b}|AXBY_{axby}$ is extended in that the functionality can be followed by definition of the respective chemical species and by introduction of corresponding superscript indices as chemical composition variables. These composition variables again total 100 mol % for each of the molecular base units and act as factors with respect to the subscript indices.

The above definition is illustrated using the example of a polymer, proceeding from a full hydrolysis only of the amide groups.

The fragments are considered to be:
0.6 mol % propionic acid
0.2 mol % benzoic acid
0.0235 mol % hex-5-en-1-amine ($NH_3$-eliminated HMD)
0.0075 mol % dodec-11-en-1-amine ($NH_3$-eliminated DDD)
0.0075 mol % (1,5,5-trimethylcyclohexen-1-yl)methanamine ($NH_3$-eliminated IPD)
0.0075 mol % azepane (cyclic HMD)
0.004 mol % azacyclotridecane (cyclic DDD)
32.13 mol % terephthalic acid
13.77 mol % isophthalic acid
41.4 mol % hexane-1,6-diamine (HMD)
3.68 mol % dodecane-1,12-diamine (DDD)
0.897 mol % 3-(aminomethyl)-3,5,5-trimethylcyclohexanamine (IPD)
0.023 mol % other diamines
1.491 mol % N'-(6-aminohexyl)hexane-1,6-diamine (HMD dimer triamine)
0.588 mol % N'-(6-aminohexyl)dodecane-1,12-diamine (HMD-DDD triamine)
0.0126 mol % N'-(12-aminododecyl)dodecane-1,12-diamine (DDD dimer triamine)
0.0084 mol % other triamines
5.145 mol % azepan-2-one (capro)
0.005 mol % amidine diacids such as 4-[(Z)-N-(6-aminohexyl)-C-hydroxycarbonimidoyl]benzoic acid (PTA-HMD amidine)

This corresponds to the following formula (I):

$A1_{0.8}|B1_{0.05}|A2_{45.9}|B2_{46}|B3_{2.1}|AX_0|BY_0AB_{5.145}|A2B_{0.005}|AXBY_0$ or $A1_{0.8}A1.1^{75}A1.2^{25}|B1_{0.05}B1.1^{47}B1.2^{15}B1.3^{15}B1.4^{15}B1.5^{8}|A2_{45.9}$
$A2.1^{70}A2.2^{30}B2_{46} B2.1^{90}B2.2^{8}B2.3^{1.95}|B3_{2.1}$
$B3.1^{70}B3.2^{28}B3.3^{0.06}$
$|AX_0|BY_0|AB_{5.145}AB.1^{100}|A2B_{0.005}|AXBY$ where propionic acid is A1.1, benzoic acid A1.2, hex-5-en-1-amine B1.1, dodec-11-en-1-amine B1.2, (1,5,5-trimethylcyclohexen-1-yl)methanamine B1.3, azepane B1.4, azacyclotridecane B1.5, terephthalic acid A2.1, isophthalic acid A2.2, hexane-1,6-diamine B2.1, dodecane-1,12-diamine B2.2, 3-(aminomethyl)-3,5,5-trimethylcyclohexanamine B2.3, N'-(6-aminohexyl)hexane-1,6-diamine B3.1, N'-(6-aminohexyl)dodecane-1,12-diamine B3.2, N'-(12-aminododecyl)dodecane-1,12-diamine B3.3, azepan-2-one AB.1, omitting species not defined specifically (such as other diamines, other triamines and amidine diacids) and showing them in each case by the difference from the sums of 100 mol % by definition.

A $PA\text{-}AB_{100}|$ is thus a strictly linear polyamide without end group control or any side reactions; it may, for example, be a PA-6, a PA-12 or a PA-6/12 copolymer. A $PA\text{-}AB_{99}|$ comprises at least 99 mol % strictly linear units and may comprise 1 mol % of any other amide-bonded units (A1, B1, A2, B2, B3, AX, BY, AB, A2B, AXBY). A $PA\text{-}AB_{100}AB.1^{99}|$ where AB.1=azacyclotridecan-2-one is thus a strictly linear polyamide without end group control or any side reactions; it comprises at least 99 mol % PA-12 units and may comprise 1 mol % of any other AB units, i.e., for example, azepan-2-one.

In one embodiment of the invention, the inventive semiaromatic copolyamide comprises predominantly only two types of fragment species, i.e. $PA\text{-}A2_{a2}|B2_{b2}|$ where a2+b2>90 mol %, preferably a2+b2>95 mol %, more preferably a2+b2>98 mol %. In one embodiment of the invention, predominantly only one type of A2 is used. In a further embodiment of the invention, predominantly only two types of A2 are used. In a further embodiment of the invention, predominantly three types of A2 are used. In a further embodiment of the invention, four or more types of A2 are used. In one embodiment of the invention, predominantly only one type of B2 is used. In a further embodiment of the invention, predominantly only two types of B2 are used. In a further embodiment of the invention, predominantly three types of B2 are used. In a further embodiment of the invention, four or more types of B2 are used. In one embodiment of the invention, the inventive semiaromatic copolyamide comprises two or more A2 species, but predominantly only one B2 species. In a further embodiment of the invention, the inventive semiaromatic copolyamide comprises two or more B2 species, but predominantly only one A2 species. In another embodiment of the invention, the inventive semiaromatic copolyamide comprises two or more A2 species and also two or more B2 species.

In one embodiment of the invention, the inventive semiaromatic copolyamide comprises predominantly only three types of fragment species, $PA\text{-}A2_{a2}|B2_{b2}|AB_{ab}$ where a2+b2+ab>90 mol %, preferably a2+b2+ab>95 mol %, more preferably a2+b2+ab>98 mol %. In one embodiment of the invention, a2+b2>ab/2. Since A2+B2 repeat units in the polyamide have two amide groups, while an AB repeat unit represents one amide group, two AB repeat units in each case have to be viewed similarly to an A2+B2 pair for many properties in the polyamide. If $\phi$ is then defined as $\phi=(a2+b2)/(a2+b2+ab/2)$ as an auxiliary parameter, in one embodiment of the invention $0.65<\phi$, in two preferred embodiments $0.65<\phi<0.75$ or $0.85<\phi$, and in two particularly preferred embodiments $0.68<\phi<0.72$ or $0.95<\phi$. In one embodiment of the invention, aside from the AB species, predominantly only one type of A2 is used. In a further embodiment of the invention, aside from the AB species, predominantly only two types of A2 are used. In a further embodiment of the invention, aside from the AB species, predominantly three types of A2 are used. In a further embodiment of the invention, aside from the AB species, four or more types of A2 are used. In one embodiment of the invention, aside from the AB species, predominantly only one type of B2 is used. In a further embodiment of the invention, aside from the AB species, predominantly only two types of B2 are used. In a further embodiment of the invention, aside from the AB species, predominantly three types of B2 are used. In a further embodiment of the invention, aside from the AB species, four or more types of B2 are used. In one embodiment of the invention, the inventive semiaromatic copolyamide comprises, aside from the AB species, two or more A2 species, but predominantly only one B2 species. In a further embodiment of the invention, the inventive semiaromatic copolyamide comprises, aside from the AB species, two or more B2 species, but predominantly only one A2 species. In another embodiment of the invention, the inventive semiaromatic copolyamide, aside from the AB species, comprises two or more A2 species and also two or more B2 species. In another embodiment of the invention, the inventive semiaromatic copolyamide comprises one AB species, one A2 species and one B2 species. In another embodiment of the invention, the inventive semiaromatic copolyamide comprises one AB species, two or more A2 species and one B2 species. In another embodiment of the invention, the inventive semiaromatic copolyamide comprises one AB species, one A2 species and two or more B2 species. In another embodiment of the invention, the inventive semiaromatic copolyamide comprises two or more AB species, one A2 species and one B2 species. In another embodiment of the invention, the inventive semiaromatic copolyamide comprises two or more AB species, two or more A2 species and one B2 species. In another embodiment of the invention, the inventive semiaromatic copolyamide comprises two or more AB species, one A2 species and two or more B2 species. In another embodiment of the invention, the inventive semiaromatic copolyamide comprises two or more AB species, two or more A2 species and two or more B2 species.

In one embodiment, the polymer comprises predominantly fragment species of the functionality $f_{A+B}=2$ (A2, B2, AB), but already significant proportions of monofunctional species $f_{A+B}=1$ (A1, B1).

In one embodiment, the polymer comprises predominantly fragment species of the functionality $f_{A+B}=2$ (A2, B2, AB), but already significant proportions of trifunctional species $f_{A+B}=3$ (B3, A2B, . . . ).

In one embodiment, the polymer comprises predominantly fragment species of the functionality $f_{A+B}=2$ (A2, B2, AB), but already significant proportions both of monofunctional species $f_{A+B}=1$ (A1, B1) and of trifunctional species $f_{A+B}=3$ (B3, A2B, . . . ).

In one embodiment, the polymer comprises predominantly fragment species of the functionality $f_{A+B}=2$ (A2, B2, AB), but already significant proportions both of monofunctional species $f_{A+B}=1$ (A1, B1) and of polyfunctional species $f_{A+B}>2$.

Irrespective of the above definition, the polyamides preparable by the process according to the invention can also be described in terms of the monomers used to prepare them. In the first step of the process according to the invention, an aqueous solution comprising at least one polyamide-forming monomer, i.e. one suitable for polyamide formation, is provided. The polyamide-forming monomers are preferably selected from
A) unsubstituted or substituted aromatic dicarboxylic acids and derivatives of unsubstituted or substituted aromatic dicarboxylic acids,
B) unsubstituted or substituted aromatic diamines,
C) aliphatic or cycloaliphatic dicarboxylic acids,
D) aliphatic or cycloaliphatic diamines,
E) monocarboxylic acids,
F) monoamines,
G) at least trifunctional amines,
H) lactams,
I) ω-amino acids, and
K) compounds which are different than A) to I) and are cocondensable therewith.

In a preferred embodiment of the invention, the polyamide-forming monomers are suitable for formation of aliphatic polyamides of the PA Z1 Z2 type (such as PA 66). In this regard, the proviso applies that at least one of components C) and D) must be present and neither of components A) and B) may be present. For aliphatic polyamides of the PA Z type (such as PA 6 or PA 12), the proviso applies that at least component H) must be present.

In a preferred embodiment of the invention, the polyamide-forming monomers are suitable for formation of semiaromatic polyamides. In this regard, the proviso applies that at least one of components A) and B) and at least one of components C) and D) must be present.

The aromatic dicarboxylic acids A) are preferably selected from in each case unsubstituted or substituted phthalic acid, terephthalic acid, isophthalic acid, naphthalenedicarboxylic acids or diphenyldicarboxylic acids, and the derivatives and mixtures of the aforementioned aromatic dicarboxylic acids.

Substituted aromatic dicarboxylic acids A) preferably have at least one $C_1$-$C_4$-alkyl radical. More preferably, substituted aromatic dicarboxylic acids A) have one or two $C_1$-$C_4$-alkyl radicals. These are preferably selected from methyl, ethyl, n-propyl, isopropyl, n-butyl, isobutyl, sec-butyl and tert-butyl, more preferably methyl, ethyl and n-butyl, even more preferably methyl and ethyl and especially methyl. Substituted aromatic dicarboxylic acids A) may also bear further functional groups which do not disrupt the amidation, for example 5-sulfoisophthalic acid, and salts and derivatives thereof. Among these, the sodium salt of dimethyl 5-sulfoisophthalate is preferred.

Preferably, the aromatic dicarboxylic acid A) is selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid. More preferably, the aromatic dicarboxylic acid A) used is terephthalic acid, isophthalic acid or a mixture of terephthalic acid and isophthalic acid.

Preferably, the aqueous solution has a proportion of aromatic dicarboxylic acids among all the dicarboxylic acids of at least 50 mol %, more preferably of 70 mol % to 100 mol %. In a preferred embodiment of the invention, the aqueous solution has a proportion of terephthalic acid or isophthalic acid or a mixture of terephthalic acid and isophthalic acid, based on all the dicarboxylic acids, of at least 50 mol %, preferably of 70 mol % to 100 mol %.

The aromatic diamines B) are preferably selected from bis(4-aminophenyl)methane, 3-methylbenzidine, 2,2-bis(4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)propane or mixtures thereof. The aromatic diamine used is more preferably m-xylylenediamine.

The aliphatic or cycloaliphatic dicarboxylic acids C) are preferably selected from oxalic acid, malonic acid, succinic acid, glutaric acid, adipic acid, pimelic acid, suberic acid, azelaic acid, sebacic acid, undecane-1,11-dicarboxylic acid, dodecane-1,12-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines D) are preferably selected from ethylenediamine, propylenediamine, tetramethylenediamine, pentamethylenediamine, hexamethylenediamine, heptamethylenediamine, octamethylenediamine, nonamethylenediamine, 2-methyl-1,8-octamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'-diaminodicyclohexylmethane and mixtures thereof.

More preferably, the diamine D) is selected from hexamethylenediamine, 2-methylpentamethylenediamine, octamethylenediamine, nonamethylenediamine, decamethylenediamine, undecamethylenediamine, dodecamethylenediamine, bis(4-aminocyclohexyl)methane, 3,3'-dimethyl-4,4'-diaminodicyclohexylmethane and mixtures thereof.

In a preferred embodiment of the invention, the aqueous solution comprises at least one diamine D) selected from hexamethylenediamine, bis(4-aminocyclohexyl)methane (PACM), 3,3'-dimethyl-4,4'-diaminodicyclohexylmethane (MACM), isophoronediamine (IPDA) and mixtures thereof. In a particularly preferred embodiment, the aqueous solution comprises exclusively hexamethylenediamine as the diamine D). In a further particularly preferred embodiment, the aqueous solution comprises exclusively bis(4-aminocyclohexyl)methane as the diamine D). In a further particularly preferred embodiment, the aqueous solution comprises exclusively 3,3'-dimethyl-4,4'-diaminodicyclohexylmethane (MACM) as the diamine D). In a further particularly preferred embodiment, the aqueous solution comprises exclusively isophoronediamine (IPDA) as the diamine D).

The aqueous solution for preparation of aliphatic or semiaromatic polyamide oligomers may comprise at least one monocarboxylic acid E). The monocarboxylic acids E) serve to end-cap the polyamide oligomers prepared in accordance with the invention. Suitable monocarboxylic acids are in principle all of those capable of reacting with at least some of the amino groups available under the reaction conditions of the polyamide condensation. Suitable monocarboxylic acids E) are aliphatic monocarboxylic acids, alicyclic monocarboxylic acids and aromatic monocarboxylic acids. These include acetic acid, propionic acid, n-, iso- or tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, 1-naphthalenecarboxylic acid, 2-naphthalenecarboxylic acid, phenylacetic acid, oleic acid, ricinoleic acid, linoleic acid, linolenic acid, erucic acid, fatty acids from soya, linseeds, castor oil plants and sunflowers, acrylic acid, methacrylic acid, tertiary saturated monocarboxylic acids (for example Versatic® acids from Royal Dutch Shell plc) and mixtures thereof.

If the monocarboxylic acids E) used are unsaturated carboxylic acids or derivatives thereof, it may be advisable to add commercial polymerization inhibitors to the aqueous solution.

More preferably, the monocarboxylic acid E) is selected from acetic acid, propionic acid, benzoic acid and mixtures thereof. In a very particularly preferred embodiment, the aqueous solution comprises exclusively acetic acid as the monocarboxylic acid E). In a further very particularly preferred embodiment, the aqueous solution comprises exclusively propionic acid as the monocarboxylic acid E). In a further very particularly preferred embodiment, the aqueous solution comprises exclusively benzoic acid as the monocarboxylic acid E).

The aqueous solution for preparation of aliphatic or semiaromatic polyamide oligomers may comprise at least one monoamine F). In this context, solutions for preparation of aliphatic or semiaromatic polyamide oligomers comprise only aliphatic monoamines or alicyclic monoamines. The monoamines F) serve to end-cap the polyamide oligomers prepared in accordance with the invention. Suitable monoamines are in principle all of those capable of reacting with at least some of the carboxylic acid groups available under the reaction conditions of the polyamide condensation. Suitable monoamines F) are aliphatic monoamines, alicyclic monoamines and aromatic monoamines. These include methylamine, ethylamine, propylamine, butylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

The aqueous solution for preparation of aliphatic or semiaromatic polyamide oligomers may additionally comprise at least one at least trifunctional amine G). These include N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethylcyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[(5-amino-1,3,3-trimethylcyclohexyl)methylamino]methyl]-3,5,5-trimethylcyclohexanamine, 3-(aminomethyl)-N-[3-(aminomethyl)-3,5,5-trimethylcyclohexyl]-3,5,5-trimethylcyclohexanamine. Preferably, no at least trifunctional amines G) are used.

Suitable lactams H) are ε-caprolactam, 2-piperidone (δ-valerolactam), 2-pyrrolidone (γ-butyrolactam), capryllactam, enantholactam, lauryllactam and mixtures thereof.

Suitable ω-amino acids I) are 6-aminocaproic acid, 7-aminoheptanoic acid, 11-aminoundecanoic acid, 12-aminododecanoic acid and mixtures thereof.

Suitable compounds K) which are different than A) to I) and are cocondensable therewith are at least tribasic carboxylic acids, diaminocarboxylic acids, etc.

Suitable compounds K) are additionally 4-[(Z)-N-(6-aminohexyl)-C-hydroxycarbonimidoyl]benzoic acid, 3-[(Z)-N-(6-aminohexyl)-C-hydroxycarbonimidoyl]benzoic acid, (6Z)-6-(6-aminohexylimino)-6-hydroxyhexanecarboxylic acid, 4-[(Z)-N-[(5-amino-1,3,3-trimethylcyclohexyl)methyl]-C-hydroxycarbonimidoyl]benzoic acid, 3-[(Z)-N-[(5-amino-1,3,3-trimethylcyclohexyl)methyl]-C-hydroxycarbonimidoyl]benzoic acid, 4-[(Z)-N-[3-(aminomethyl)-3,5,5-trimethylcyclohexyl]-C-hydroxycarbonimidoyl]benzoic acid, 3-[(Z)-N-[3-(aminomethyl)-3,5,5-trimethylcyclohexyl]-C-hydroxycarbonimidoyl]benzoic acid and mixtures thereof.

In a preferred embodiment of the invention, the process according to the invention serves for preparation of an aliphatic polyamide oligomer.

In that case, the polyamide is preferably selected from PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912, PA 1212, and copolymers and mixtures thereof. More preferably, the aliphatic polyamide is PA 6, PA 66 or PA 666, most preferably PA 6.

In a further preferred embodiment of the invention, the process according to the invention serves for preparation of a semiaromatic polyamide. In that case, the polyamide is preferably selected from PA 6.T, PA 9.T, PA8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.1, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof. In that case, the polyamide is more preferably selected from PA 6.T, PA 9.T, PA 10.T, PA 12.T, PA 6.I, PA 9.I, PA 10.I, PA 12.I, PA 6.T/6.I, PA 6.T/6, PA6.T/8.T, PA 6.T/10T, PA 10.T/6.T, PA 6.T/12.T, PA12.T/6.T, PA IPDA.I, PA IPDA.T, PA 6.T/IPDA.T, PA 6.T/6.I/IPDA.T/IPDA.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

The process according to the invention comprises several steps and begins with the continuous conveying of the aqueous monomer solution, for example from one or more temperature-controllable and inertizable autoclaves as reservoir vessels. The aqueous monomer solution itself can be prepared in temperature-controllable and inertizable mixing vessels, which may appropriately be stirred or circulated by pumping. In principle, the aqueous monomer solution can also be prepared continuously in a suitable flow unit with mixing elements.

For preparation of the monomer solution, it is possible to use approximately equimolar amounts of dicarboxylic acids and diamines, though at least one aromatic dicarboxylic acid must be present for preparation of semiaromatic polyamide oligomers. The desired composition, optionally including a defined excess of diamine or dicarboxylic acid, can be monitored by simple acid/base titration and the aqueous mixture can optionally be adjusted to the desired composition by adjusted metered addition of the missing acid or amine component.

In addition to monomers and water, the monomer solution may comprise further components. These are preferably selected from catalysts, chain transfer agents, application-related additives and mixtures thereof. Suitable additives are flame retardants, inorganic and organic stabilizers, lubricants, dyes, nucleating agents, metallic pigments, metal flakes, metal-coated particles, antistats, conductivity additives, demolding agents, optical brighteners, defoamers, fillers and/or reinforcers, etc.

For the inventive preparation of the polyamide oligomers, it is possible to use at least one catalyst. Suitable catalysts are preferably selected from inorganic and/or organic phosphorus, tin or lead compounds, and mixtures thereof.

Examples of tin compounds suitable as catalysts include tin(II) oxide, tin(II) hydroxide, tin(II) salts of mono- or polybasic carboxylic acids, e.g. tin(II) dibenzoate, tin(II) di(2-ethylhexanoate), tin(II) oxalate, dibutyltin oxide, butyltin acid ($C_4H_9$—SnOOH), dibutyltin dilaurate, etc. Suitable lead compounds are, for example, lead(II) oxide, lead(II) hydroxide, lead(II) acetate, basic lead(II) acetate, lead(II) carbonate, etc.

Preferred catalysts are phosphorus compounds such as phosphoric acid, phosphorous acid, hypophosphorous acid, phenylphosphonic acid, phenylphosphinic acid and/or salts thereof with mono- to trivalent cations, for example Na, K, Mg, Ca, Zn or Al and/or esters thereof, for example triphenyl phosphate, triphenyl phosphite or tris(nonylphenyl) phosphite. Particularly preferred catalysts are hypophosphorous acid and salts thereof, such as sodium hypophosphite.

The catalysts are preferably used in an amount of 0.005 to 2.5% by weight, based on the total weight of the monomer solution provided.

Particular preference is given to using hypophosphorous acid and/or a salt of hypophosphorous acid in an amount of 50 to 1000 ppm, more preferably of 100 to 500 ppm, based on the total amount of the components suitable for polyamide formation (=components A) to K)).

The ring-opening lactam polymerization can be effected purely hydrolytically without use of a catalyst. In the case of activated anionic lactam polymerization, catalysts which enable the formation of lactam anions are used. Suitable catalysts and activators are known to those skilled in the art. The polycondensation of aminonitriles, for example the preparation of polyamide-6 from 6-aminocapronitrile (ACN), can be performed in the presence of a heterogeneous catalyst, such as $TiO_2$.

For control of the molar mass, it is possible to use at least one chain transfer agent. Suitable chain transfer agents are the monocarboxylic acids A) and monoamines F) mentioned above in the components suitable for polyamide formation. The chain transfer agent is preferably selected from acetic acid, propionic acid, butyric acid, valeric acid, caproic acid, lauric acid, stearic acid, 2-ethylhexanoic acid, cyclohexanoic acid, benzoic acid, 3-(3,5-di-tert-butyl-4-hydroxyphenyl)propanoic acid, 3,5-di-tert-butyl-4-hydroxybenzoic acid, 3-(3-tert-butyl-4-hydroxy-5-methylphenyl)propanoic acid, 2-(3,5-di-tert-butyl-4-hydroxybenzylthio)acetic acid, 3,3-bis(3-tert-butyl-4-hydroxyphenyl)butanoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, 2,2,6,6-tetramethylpiperidin-4-amine, 1,2,2,6,6-pentamethylpiperidin-4-amine, 4-amino-2,6-di-tert-butylphenol and mixtures thereof. It is also possible to use other monofunctional compounds which can react with an amino or acid group as the transfer agent, such as anhydrides, isocyanates, acid halides or esters. For control of the molecular weight, it is also possible to use a diamine component or a diacid component in a stoichiometric excess. A suitable chain transfer agent of this kind is hexamethylenediamine. The customary use amount of the chain transfer agents is within a range from 5 to 500 mmol per kg of polyamide oligomer, preferably 10 to 200 mmol per kg of polyamide oligomer.

If desired, further additives other than catalysts and chain transfer agents can be added to the monomer solution.

The additives which can specifically be added directly to the monomer solution include, for example, antioxidants, light stabilizers, customary processing aids, nucleating agents and crystallization accelerators. Fillers and reinforcers, in contrast, are preferably added before and/or during the final postpolymerization. For example, they can be added to the inventive polyamide oligomers in the course of postpolymerization in an extruder or kneader.

If the monomer solution is prepared in a stirred tank, preference is given to using a certain amount of water as an initial charge and feeding in the amine and carboxylic acid compounds described in a suitable sequence, such that the heat of neutralization which arises can be utilized and there is a minimum level of agglomeration of solids in the inlet and at the stirrer. Optionally, further water can be fed in with or after the addition of the amine and carboxylic acid compounds described, or one or more of the starting compounds can directly be metered in as an aqueous solution themselves.

The monomer solution may especially comprise 5 to 95% by weight of water, based on the sum of water and the polyamide-forming monomers described. Since particular significance attaches to the monitoring of the respective water balance later in the process according to the invention, it is appropriate to exactly set the water content in the dissolution step. The water content is preferably sufficiently low that no unnecessary energy losses occur when water is withdrawn in the downstream polycondensation process according to the invention. On the other hand, the water content is preferably just high enough that the starting compounds still dissolve fully in the dissolution step to give a mixture conveyable in fluid form. In this context, the aqueous solution at the end of the dissolution step is preferably a clear solution. According to the composition of the starting formulation, it may, however, also be a cloudy, conveyable fluid of defined composition, by virtue of the actual solution still comprising phase-separated components in the manner of a suspension or emulsion. However, particular preference is given to a transparently clear solution.

It is advantageous when the solution comprises 15 to 55% by weight of water. 18 to 40% by weight of water is often particularly advantageous, and 20 to 30% by weight of water is very particularly advantageous. If the monomer solution is prepared in a stirred tank, the latter, after the introduction of the starting compounds and inertization, is brought to temperatures of preferably 90° C. to 220° C., more preferably to 100° C. to 160° C., most preferably 120° C. to 140° C., for dissolution. In the course of this, the typical partial steam pressures are established. The pressure of the monomer solution at a given temperature may be slightly lowered compared to that of pure water as a result of electrolyte effects of the monomer salt. On the other hand, the pressure in the presence of further volatile components, for example alcohols, may be increased by the magnitude of the partial vapor pressure thereof.

Solutions comprising 18 to 35% by weight of water at temperatures of 100° C. to 160° C. have pressures of especially 0.1 MPa to 0.6 MPa. At temperatures up to 220° C., pressures of especially up to 2.3 MPa are established. Particularly at temperatures of more than 140° C., the dissolution operation can optionally be effected with partial preliminary reaction to give low molecular weight oligoamides.

If the monomer solution is prepared in a stirred tank, the dissolution time will be crucially dependent on the speed of the heating operation and optionally the particle size distribution and/or polarity and/or melting temperature of the starting compounds.

At a water content of 15 to 55% by weight, and at the temperatures and pressures specified, a suitable monomer solution which can be conveyed in a fluid manner and can be stored for several hours is obtained under agitation, especially after 5 to 120 minutes, usually after 10 to 60 minutes.

If the monomer solution is prepared in a stirred tank, the end of the dissolution operation is preferably followed by transfer of the tank contents into a reservoir vessel.

If the monomer solution is not prepared batchwise but in a fully continuous dissolution unit, the dissolution conditions specified for the stirred tank are applied mutatis mutandis. The profile of the temperature increase against time in the course of heating the tank and the associated pressure increase can be depicted here as a spatial profile, for example in a tank cascade or in a flow unit.

In one embodiment of the invention, the continuous dissolution unit used is an introduction tank with pumped circulation and an adjoining tube with jacket heating, with introduction of water and aqueous diamine solution by means of metering pumps and conveying screws to assume the task of metering in the solid starting compounds. Here too, the monomer solution obtained downstream of the dissolution zone can be conveyed into a reservoir vessel.

The reservoir vessels used in the process according to the invention are especially one or more temperature-controllable and inertizable autoclaves. For agitation of the monomer solution prepared therein, the autoclaves may be equipped with a stirrer or a pumped circulation system. The autoclaves are preferably inertized, more preferably with nitrogen.

More particularly, the temperature and pressure conditions in the storage vessel correspond substantially to those at the end of the dissolution operation. Particularly when relatively high temperatures are used for the dissolution operation, at which conversions of the monomers can already occur over a relatively long period, it is alternatively also possible to select a somewhat lower temperature in the reservoir vessel. In this context, however, the temperature should preferably be set such that no substantial proportions of the monomer solution precipitate out as solids and optionally even sediment. Preferably, the monomer solution is kept ready under inertization at a slight nitrogen overpressure and/or with a gentle nitrogen overflow.

In the continuous process according to the invention, the monomer solution is withdrawn continuously from the reservoir vessel and heated beyond the dissolution or storage temperature in oligomerization reactor(s) until the oligomerization reaction to give the oligomers can proceed at sufficient speed but controllably, and the oligomers thus obtained can be discharged continuously or sent to a further process for preparing higher molecular weight polyamides.

In the continuous process according to the invention, during a first mean residence time t1, the temperature of the reaction mixture preferably approaches or reaches a first oligomerization temperature OT1. In the course of this, the pressure or the partial steam pressure approaches or is a first pressure p1. Subsequently, during a second mean residence time t2, the temperature of the reaction mixture approaches or reaches a second oligomerization temperature OT2. In addition, the pressure or the partial steam pressure approaches or is a second pressure p2. Preferably, $OT1 \leq OT2$ and $t1 \geq t2$. The first pressure p1 preferably corresponds to the saturation vapor pressure of water at the first oligomerization temperature OT1 (optionally slightly reduced by electrolytic effects and/or optionally increased by the partial vapor pressure of an alcohol), while the second pressure p2 is below the saturation vapor pressure of water at the second oligomerization temperature OT2. The latter corresponds to a controlled loss of water and volatile components of the reaction mixture. In the continuous process according to the invention, preferably, p1 ≥p2. In order to supply the energy requirement of the reaction mixture which arises in the course of vaporization of the water and bring it to or keep it at the second oligomerization temperature OT2, it is preferable in one embodiment of the invention to arrive at a slightly superheated oligomer mixture at the end of the residence time t1. In this context, in a departure from the above-described embodiment of the invention, it may also be advantageous to select an OT1≥OT2 temperature profile. The intrinsic water loss of the reaction mixture puts an upper limit on the second mean residence time t2, since it is not supposed to phase-separate or spontaneously crystallize.

In a particular embodiment, rather than a single oligomerization temperature OT1, it is possible to use a plurality of successive oligomerization temperatures OT1-1 to OT1-x. The temperature change can be effected stepwise or in the form of a gradient. To establish a plurality of different successive oligomerization temperatures, the oligomerization reactor may have different separately controllable heating zones. Alternatively, it is possible to use separate successive oligomerization reactors. In this case, the temperature profile selected is usually ascending, such that OT1-1≤OT1-2, etc. The sum total of the respective assigned residence times t1-1 to t1-x in turn gives the residence time t1.

The monitoring of the partial steam pressure in the continuous process according to the invention is of particular significance. The buildup or maintenance of a particular partial steam pressure can especially be effected by feeding in steam at a defined pressure level. On the other hand, regulating valves offer the option of letting off steam and other volatile components from the respective units in a controlled manner.

The first oligomerization temperature OT1 in the process according to the invention is preferably 220° C. to 260° C., more preferably 225° C. to 255° C., most preferably 230° C. to 250° C. The first mean residence time t1 is preferably 0 min to 240 min, more preferably 45 min to 120 min, most preferably 60 min to 90 min. The first pressure p1 is preferably 1.5 MPa to 5.0 MPa, more preferably 2.5 MPa to 4.5 MPa, most preferably 3.0 MPa to 4.0 MPa. The second oligomerization temperature OT2 is preferably 240° C. to 300° C., more preferably 240° C. to 280° C., most preferably 240° C. to 260° C. The second mean residence time t2 is preferably 0 min to 60 min, more preferably 20 min to 50 min, most preferably 25 min to 40 min. The second pressure p2 is preferably 1.9 MPa to 5.0 MPa, more preferably 2.3 MPa to 5.0 MPa, most preferably 2.5 MPa to 4.0 MPa. The sum of the residence times t1 +t2 is preferably at least 10 min.

In the process steps in which the water content of the reaction mixture is lowered, critical boundary conditions with regard to pressure and partial steam pressure should especially be observed in order to avoid spontaneous separation or crystallization phenomena in the reaction mixture. It has been found that, for different formulations of polyamide oligomers, substantially independently of the reaction temperatures, critical lower partial steam pressures are observed, above which sufficient water is kept within the system to ensure reaction mixtures with controllable phase characteristics. The critical lower partial steam pressures depend on the formulations and here, in a first approximation, on the ratio of the number of amide groups (n.NHCO) to the number of carbon atoms (n.C). In a second approximation, the melting point of the respective polyamide should also be taken into account. The critical lower partial steam pressure p.u. is calculated in a first approximation from formula 1:

$$p.u. = 61.463 \text{ MPa} \cdot \frac{n.NHCO}{n.C} - 4.7193 \text{ MPa} \qquad \text{(formula 1)}$$

It may be necessary to raise the second pressure p2 which occurs in the continuous process according to the invention to a level above the critical lower partial steam pressure p.u. if, in one embodiment of the continuous process according to the invention, the oligomer mixture exhibits separation or crystallization phenomena.

The oligomerization reactors used in the process according to the invention are preferably two or more units which can be charged and emptied continuously, and which enable temperatures above the dissolution or storage temperature, which permit elevated pressures, in order to keep enough water in the system, and of which at least one unit is equipped with a pressure regulator such that water can be withdrawn from the reaction mixture in a controlled manner. Examples of suitable units are a temperature-controllable autoclave with a steam feed and/or pressure-regulating valve, a cascade of temperature-controllable autoclaves, one or more of which have a steam feed and/or pressure-regulating valve, a temperature-controllable heat exchanger reactor, preferably in the form of a jacketed, temperature-controllable tubular reactor, a cascade of temperature-controllable heat exchanger reactors, preferably in the form of jacketed, temperature-controllable tubular reactors or shell and tube reactors, or a combination of the units listed.

In a preferred implementation of the invention, a heat exchanger reactor is used in combination with an autoclave equipped with a pressure-regulating valve and a base outlet. In a particularly preferred implementation of the invention, the mean residence time in the heat exchanger reactor is the first mean residence time t1 and that in the autoclave the second mean residence time t2. The heat exchanger reactor may preferably be a jacketed tubular reactor or shell and tube reactor. The heat exchanger reactor may have internals such as baffles in the intake or static mixers at suitable points. The autoclave may be jacketed and/or comprise a heating coil and/or have a conical base. For continuous mixing of its contents, the autoclave may be stirred or have pumped circulation. To promote the input of heat, the autoclave may be provided with a heat exchanger in a pumped circulation system.

In a further preferred implementation of the invention, a cascade of at least two temperature-controllable autoclaves is used, of which at least the last is equipped with a pressure-regulating valve. In a particularly preferred implementation of the invention, the mean residence time in the forward autoclaves (comprising a maximum of all but the last autoclave) is the first mean residence time t1 and that in the rearward autoclaves (comprising at least the last autoclave) the second mean residence time t2. The autoclaves may be jacketed and/or comprise heating coils and/or be provided with a heat exchanger in a pumped circulation system. For continuous mixing of their contents, the autoclaves may be stirred or have pumped circulation. The last autoclave preferably has a conical base with a base outlet.

In one embodiment of the continuous process according to the invention, the polyamide oligomers are discharged from the oligomerization zone in such a way that they are obtained in solid form, optionally with adhering water, and can be isolated as such. This embodiment is particularly suitable when the semiaromatic oligomers solidify in crystalline or semicrystalline form. This embodiment is less suitable when the semiaromatic oligomers are obtained in amorphous form and/or are difficult to solidify as solids.

In a further embodiment of the continuous process according to the invention, the oligomers are discharged from the oligomerization zone in such a manner that they are obtained in molten form and can be transferred continuously without isolation into a further process in which higher molecular weight polyamides are prepared from the oligomers. This embodiment is suitable both for amorphous and for potentially crystallizing semiaromatic oligomers.

In a third embodiment of the continuous process according to the invention, the oligomers are discharged from the oligomerization zone in such a manner that they are obtained fully or partly in solid form but are transferred continuously without isolation of the oligomers into a process in which higher molecular weight polyamides are prepared from the oligomers. This embodiment is suitable both for selected amorphous and for selected crystallizing semiaromatic oligomers.

As advantageous aspects of the process according to the invention, it has been recognized that higher throughputs with lower capital costs can be achieved compared to the prior art. In addition, there are none of the residence time losses which occur in the case of batchwise preparation of the oligomers when the monomer solution is introduced, when it is heated to reaction temperature, when the reaction mixture is discharged and when it is subsequently cooled. An important advantage is likewise the constancy of quality of the products from the continuous process, which is not compromised by startup and shutdown operations of a batchwise process. It is also of economic relevance that continuous processes can generally be operated with a lower personnel level, and lower material losses with quality deviations have to be accepted. These advantages generally more than compensate for possible disadvantages such as material losses in the event of formulation changeovers.

It is a particular advantage of the process according to the invention that a steady state can be established much more easily than in batchwise processes, in which the oligomers, at defined temperature, defined pressure or partial steam pressure and defined residence time, have a target conversion and hence the desired mean molar mass. It is thus also possible to control the breadth of the molar mass distribution in an advantageous manner and hence also to selectively prepare narrow-distribution oligomers.

The process according to the invention can be used within a wide composition range for oligomers of semicrystalline or amorphous, thermoplastically processible, semiaromatic polyamides.

In the process according to the invention, on discharge of the oligomer, it should especially be ensured that, as well as the last oligomerization unit, all discharge lines, internals and conveying units are kept at the same temperature and at least at the same partial steam pressure as in the last oligomerization unit. In general, there is no need for a complex determination of the partial steam pressure, and it is instead possible to use the total pressure of the last oligomerization unit as a reference parameter, since the partial pressures of the other gas constituents, such as inert gas (for example nitrogen), volatile starting compounds (for example hexamethylenediamine), small proportions of alcohols initially added or any decomposition products which form (for example $NH_3$ from amines or $CO_2$ from carboxylic acids), measured by the total pressure, are negligibly small. The proportion of the inert gas or optionally of the alcohols decreases significantly in any case as a result of the controlled expansion necessary during the second mean residence time t2, and in the course of this is displaced virtually completely by vaporized water which originates from the monomer solution and is formed in the oligomerization reaction.

In the process, a conversion of 67% to 97.5% is preferably attained, more preferably of 75% to 96%, most preferably of 80% to 92%. The conversion reported in this document always relates to that functionality (carboxyl or amino functionality) which is in deficiency in the reaction mixture.

The polyamide oligomer formed in the process according to the invention thus has a degree of polymerization of preferably 3 to 15, more preferably of 4 to 25, most preferably of 5 to 12. According to the starting compounds used, this corresponds to absolute molar masses of 300 to 8000 g/mol or 400 to 5000 g/mol or 500 to 2500 g/mol. If molar mass distributions are determined on the oligomers formed in the process according to the invention with the aid of gel permeation chromatography in hexafluoroisopropanol (HFIP) against narrow-distribution PMMA standards, apparent molar masses of 200 to 4000 g/mol or 250 to 2500 g/mol or 300 to 1500 g/mol are obtained for these.

If the oligomers are discharged from the oligomerization zone at the end of the continuous process in such a way that they are obtained in solid form and can be isolated, preference is given to a spray discharge into an inertized volume at temperatures below the melting point of the oligomers. Particularly in the case of use of spray nozzles, the intrinsic constancy of continuous processes is beneficial, since occasional startup and shutdown phases are negligible compared to the continuous discharge period and, at the same time, undisrupted homogeneous operation can be achieved with high product and particle constancy in the course of spraying. As an alternative to spray discharge, discharge as a voluminous oligomer foam by means of a die plate having one or more holes having a relatively high diameter into an inertized volume is also possible. The foam, which is brittle after cooling, can be comminuted as desired in a simple manner in a mechanical unit such as a crusher or mill.

Discharge into an inertized volume has the effect that some of the water dissolved in the oligomer melts is vaporized instantaneously and the oligomer is cooled in the process. As a result, the oligomers are obtained in solid, substantially crystallized form. The oligomers can be obtained in finely divided form as more or less compact particles, but also as porous loose flakes or irregular solid structures. The resulting oligomers can, optionally after further mechanical comminution and/or drying, be conveyed in a suitable manner, optionally melted again and sent to a suitable further process in which higher molecular weight polyamides are prepared therefrom.

In one embodiment of the process according to the invention, the oligomer melt is discharged through a one-phase nozzle under the intrinsic partial steam pressure. The person skilled in the art is aware of suitable nozzle geometries. The one-phase nozzle may be configured, inter alia, as a simple bore, as a bore with a deflector, or as a Laval nozzle. In a preferred embodiment, a one-phase nozzle with a simple bore having a diameter of 0.1 to 10 mm, more preferably of 0.5 to 5 mm, most preferably of 2 to 4 mm, is used. In a further preferred embodiment, a one-phase nozzle with a deflector having a diameter of 0.1 to 10 mm, more preferably of 0.5 to 5 mm, most preferably of 2 to 4 mm, is used.

In one embodiment of the process according to the invention, the oligomer melt is discharged through a two-phase nozzle under the intrinsic partial steam pressure and using a separate feed of carrier gas. The separate feed of carrier gas may, for example, be nitrogen, steam or moistened nitrogen. The two-phase nozzle may be configured with an annular gap or with serial outlet orifices for the carrier gas lying on a circular path, around the central outlet of the oligomer melt. In a preferred embodiment, a two-phase nozzle is used, in which the inner bore has a diameter of 0.1 to 10 mm, more preferably of 0.5 to 5 mm, most preferably of 2 to 4 mm, and is surrounded by an annular gap of thickness 0.1 to 5 mm, more preferably of 0.5 to 2 mm, most preferably of 1 to 2 mm. In a further preferred embodiment, a Laval two-phase nozzle is used, the orifice of which corresponds to a paraboloid section.

Discharge into an inertized volume refers here to a possibly cooled cyclone or spray tower or a comparable unit. Spray discharge into an inertized volume is preferably performed in apparatuses also suitable for spray drying. Such apparatuses are described, for example, in K. Masters, Spray Drying Handbook, 5th Edition, Longman, 1991, p. 23-66.

In the process according to the invention, it is possible to use one or more spray nozzles, to which the fluid to be sprayed is fed under pressure, generally under the second pressure p2. The atomization of the fluid to be sprayed can be effected by expanding it in the nozzle bore on attainment of a particular minimum velocity. It is also possible to use one-phase nozzles for the inventive purpose, for example slit nozzles or swirl chambers, or full-cone nozzles (for example from Düsen-Schlick GmbH, Germany, or from Spraying Systems Deutschland GmbH, Germany).

The term "inertized volume" may also comprise apparatuses in which the oligomer mixture can fall freely into inert atmosphere in the form of droplets. Suitable apparatuses for this purpose are as described, for example, in U.S. Pat. No. 5,269,980.

Droplet production by laminar jet decomposition, as described in Rev. Sci. Instr. 38 (1966) 502, is likewise possible.

The droplets can also be produced by means of pneumatic drawing nozzles, rotation, cutting of a jet or rapidly actuatable microvalve nozzles. In a pneumatic drawing nozzle, a liquid jet together with a gas stream is accelerated through a die plate. The gas rate can be used to influence the diameter of the liquid jet and hence the droplet diameter.

In the case of droplet generation by rotation, the liquid passes through the orifices of a rotating disk. The centrifugal force which acts on the liquid tears off droplets of defined size. Preferred apparatus for rotary dropletization is described, for example, in DE 43 08 842 A1. The emerging liquid jet can also be cut into defined segments by means of a rotating blade. Each segment subsequently forms a droplet. In the case of use of microvalve nozzles, droplets with defined liquid volume are obtained directly.

If the oligomers are to be discharged from the oligomerization zone at the end of the continuous process in such a way that they are obtained in molten form and can be transferred directly into a process for preparing higher molecular weight polyamides, a downstream combination of vaporizer reactor and separator is advantageous. Since the reaction in these units, however, can already reach conversions corresponding to molar masses above the defined oligomers, the conclusion of the process according to the invention is defined as being the continuous discharge of the oligomer melt from the last oligomerization unit. Such a continuous discharge can be effected, for example, by means of pumps and into pipelines with jacket heating. Suitable pumps for oligomer melts are, for example, spinning pumps.

If the oligomers are to be discharged from the oligomerization zone at the end of the continuous process in such a way that they are transferred continuously, but without isolation of the oligomers, into the next process section, irrespective of whether or not they are obtained fully or partly as solid intermediates, spray discharge with the aid of the above-described nozzles into an inertized volume is preferable. The oligomer is collected at the foot of the spray volume and discharged with the aid of suitable conveying devices.

In this case, according to the configuration of the spray volume, and the physical condition during the discharge, especially temperature and partial steam pressure in the inertized volume, the oligomer is obtained differently at the foot of the spray volume: If oligomer droplets, for example, cool significantly and solidify as a result of vaporization of water, the oligomer can be transported onward from the foot of the spray volume with the aid of suitable continuous solids conveying units. If the oligomer droplets, in spite of the vaporization of water, heat up during the fall or in the foot of the spray volume to temperatures, for example, above the melting point of the oligomer, continuous discharge of a melt is possible by means of suitable units. If the conditions of the spray discharge are between these two boundaries, the oligomer may be obtained as a pasty mixture of solids and melt at the foot of the spray volume and can be conveyed onward, for example, by means of heated extruder screws.

A further example of such an embodiment is discharge from the oligomerization zone with complete or partial decompression directly into an extruder in which the further condensation reaction to give a polymer is conducted. In this case, preference is given to extruders which can achieve high degassing performance, for example twin-screw extruders, planetary roller extruders or ring extruders. Any oligomers obtained in solid form are melted again directly without further isolation and melt-condensed in the extruder with choice of a suitable temperature and residence time.

In a further process according to the invention, the higher molecular weight, semicrystalline or amorphous, thermoplastically processible polyamides are prepared proceeding from the oligomers. The process comprises continuous provision of a mixture comprising water and the polyamide oligomer and postcondensation of the polyamide oligomer to give a polyamide. The mixture is preferably obtained continuously by the above-described process for preparing a polyamide oligomer, and in that case is at the second oligomerization temperature OT2 and the second pressure p2 mentioned in the last oligomerization unit.

The inventive aliphatic polyamides, and those obtained by the process according to the invention, preferably have a number-average molecular weight $M_n$ within a range from 13 000 to 28 000 g/mol. The figures for the number-average molecular weight $M_n$ and the weight-average molecular weight $M_w$ in the context of this invention relate to a determination by means of gel permeation chromatography (GPC). For calibration, PMMA was used as polymer standard having a low polydispersity.

The inventive semiaromatic polyamides, and those obtained by the process according to the invention, preferably have a number-average molecular weight $M_n$ within a range from 13 000 to 25 000 g/mol, more preferably from 15 000 to 20 000 g/mol.

The inventive aliphatic polyamides, and those obtained by the process according to the invention, preferably have a weight-average molecular weight $M_w$ within a range from 20 000 to 140 000 g/mol.

The inventive semiaromatic polyamides, and those obtained by the process according to the invention, preferably have a weight-average molecular weight $M_w$ within a range from 25 000 to 125 000 g/mol.

The inventive aliphatic and semiaromatic polyamides, and those obtained by the process according to the invention, preferably have a polydispersity PD ($=M_w/M_n$) not exceeding 6, more preferably not exceeding 5, especially not exceeding 3.5.

The aliphatic and semiaromatic polyamides obtainable from oligomers by the second process according to the invention can be used for production of moldings by means of any suitable processing techniques. Suitable processing techniques are especially injection molding, multicomponent injection molding, injection molding/welding, extrusion, coextrusion, blow molding and thermoforming. For this purpose, reinforcers and fillers such as glass fibers, carbon fibers, mineral reinforcers and fillers, and other modifiers, for example flame-retardant additives or antistats, can be added to the polyamides mentioned.

The aliphatic polyamides obtainable by the process according to the invention are especially suitable for production of films, monofilaments, fibers, yarns or textile fabrics. In this context, the aliphatic polyamides prepared in accordance with the invention are generally found to be particularly stable to processing during a melt extrusion through slot dies or annular dies to form flat or blown films, and through annular dies of smaller diameter to form monofilaments.

The semiaromatic polyamides obtainable by the process according to the invention likewise have advantageous properties.

The inventive semiaromatic polyamide, and that obtained by the process according to the invention, preferably has a gel content not exceeding 5% by weight, based on the total weight of the polyamide.

The semiaromatic polyamide, and that obtained by the process according to the invention, preferably has a viscosity number of 80 to 120 ml/g. The viscosity number (Staudinger function, referred to as VN or J) is defined as $VN=1/c \times (\eta-\eta_s)/\eta_s$. The viscosity number is directly related to the mean molar mass of the polyamide and gives information about the processibility of a polymer. The viscosity number can be determined to EN ISO 307 with an Ubbelohde viscometer.

Polyamide Molding Composition

The invention further provides a polyamide molding composition comprising at least one inventive semiaromatic copolyamide.

Preference is given to a polyamide molding composition comprising:
A) 25 to 100% by weight of at least one semiaromatic copolyamide, as defined above,
B) 0 to 75% by weight of at least one filler and reinforcer,
C) 0 to 50% by weight of at least one additive,
where components A) to C) together add up to 100% by weight.

The term "filler and reinforcer" (=component B) is understood in a broad sense in the context of the invention and comprises particulate fillers, fibrous substances and any intermediate forms. Particulate fillers may have a wide range of particle sizes ranging from particles in the form of dusts to large grains. Useful filler materials include organic or inorganic fillers and reinforcers. For example, it is possible to use inorganic fillers, such as kaolin, chalk, wollastonite, talc, calcium carbonate, silicates, titanium dioxide, zinc oxide, graphite, glass particles, e.g. glass beads, nanoscale fillers, such as carbon nanotubes, carbon black, nanoscale sheet silicates, nanoscale alumina ($Al_2O_3$), nanoscale titania ($TiO_2$), graphene, permanently magnetic or magnetizable metal compounds and/or alloys, sheet silicates and nanoscale silica ($SiO_2$). The fillers may also have been surface treated.

Examples of sheet silicates used in the inventive molding compositions include kaolins, serpentines, talc, mica, vermiculites, illites, smectites, montmorillonite, hectorite, double hydroxides or mixtures thereof. The sheet silicates may have been surface treated or may be untreated.

In addition, it is possible to use one or more fibrous substances. These are preferably selected from known inorganic reinforcing fibers, such as boron fibers, glass fibers, carbon fibers, silica fibers, ceramic fibers and basalt fibers; organic reinforcing fibers, such as Aramid fibers, polyester fibers, nylon fibers, polyethylene fibers and natural fibers, such as wood fibers, flax fibers, hemp fibers and sisal fibers.

It is especially preferable to use glass fibers, carbon fibers, Aramid fibers, boron fibers, metal fibers or potassium titanate fibers.

Specifically, chopped glass fibers are used. More particularly, component B) comprises glass fibers and/or carbon fibers, preference being given to using short fibers. These preferably have a length in the range from 2 to 50 mm and a diameter of 5 to 40 µm. Alternatively, it is possible to use continuous fibers (rovings). Suitable fibers are those having a circular and/or noncircular cross-sectional area, in which latter case the ratio of dimensions of the main cross-sectional axis to the secondary cross-sectional axis is especially >2, preferably in the range from 2 to 8 and more preferably in the range from 3 to 5.

In a specific implementation, component B) comprises what are called "flat glass fibers". These specifically have a cross-sectional area which is oval or elliptical or elliptical and provided with indentation(s) (called "cocoon" fibers) or rectangular or virtually rectangular. Preference is given here to using glass fibers with a noncircular cross-sectional area and a ratio of dimensions of the main cross-sectional axis to the secondary cross-sectional axis of more than 2, preferably of 2 to 8, especially of 3 to 5.

For reinforcement of the inventive molding compositions, it is also possible to use mixtures of glass fibers having circular and noncircular cross sections. In a specific implementation, the proportion of flat glass fibers, as defined above, predominates, meaning that they account for more than 50% by weight of the total mass of the fibers.

If rovings of glass fibers are used as component B), these preferably have a diameter of 10 to 20 µm, preferably of 12 to 18 µm. In this case, the cross section of the glass fibers may be round, oval, elliptical, virtually rectangular or rectangular. Particular preference is given to what are called flat glass fibers having a ratio of the cross-sectional axes of 2 to 5. More particularly, E glass fibers are used. However, it is also possible to use all other glass fiber types, for example A, C, D, M, S or R glass fibers or any desired mixtures thereof, or mixtures with E glass fibers.

The inventive polyamide molding compositions can be produced by the known processes for producing long fiber-reinforced rod pellets, especially by pultrusion processes, in which the continuous fiber strand (roving) is fully saturated with the polymer melt and then cooled and cut. The long fiber-reinforced rod pellets obtained in this manner, which preferably have a pellet length of 3 to 25 mm, especially of 4 to 12 mm, can be processed further by the customary processing methods, for example injection molding or press molding, to give moldings.

The inventive polyamide molding composition comprises preferably 25 to 75% by weight, more preferably 33 to 60% by weight, of at least one filler and reinforcer B), based on the total weight of the polyamide molding composition.

Suitable additives C) are heat stabilizers, flame retardants, light stabilizers (UV stabilizers, UV absorbers or UV blockers), lubricants, dyes, nucleating agents, metallic pigments, metal flakes, metal-coated particles, antistats, conductivity additives, demolding agents, optical brighteners, defoamers, etc.

As component C), the inventive molding compositions comprise preferably 0.01 to 3% by weight, more preferably 0.02 to 2% by weight and especially 0.1 to 1.5% by weight of at least one heat stabilizer.

The heat stabilizers are preferably selected from copper compounds, secondary aromatic amines, sterically hindered phenols, phosphites, phosphonites and mixtures thereof.

If a copper compound is used, the amount of copper is preferably 0.003 to 0.5%, especially 0.005 to 0.3% and more preferably 0.01 to 0.2% by weight, based on the sum of components A) to C).

If stabilizers based on secondary aromatic amines are used, the amount of these stabilizers is preferably 0.2 to 2% by weight, more preferably from 0.2 to 1.5% by weight, based on the sum of components A) to C).

If stabilizers based on sterically hindered phenols are used, the amount of these stabilizers is preferably 0.1 to 1.5% by weight, more preferably from 0.2 to 1% by weight, based on the sum of components A) to C).

If stabilizers based on phosphites and/or phosphonites are used, the amount of these stabilizers is preferably 0.1 to 1.5% by weight, more preferably from 0.2 to 1% by weight, based on the sum of components A) to C).

Suitable compounds C) of mono- or divalent copper are, for example, salts of mono- or divalent copper with inorganic or organic acids or mono- or dihydric phenols, the oxides of mono- or divalent copper or the complexes of copper salts with ammonia, amines, amides, lactams, cyanides or phosphines, preferably Cu(I) or Cu(II) salts of the hydrohalic acids or of the hydrocyanic acids or the copper salts of the aliphatic carboxylic acids. Particular preference is given to the monovalent copper compounds CuCl, CuBr, CuI, CuCN and $Cu_2O$, and to the divalent copper compounds $CuCl_2$, $CuSO_4$, CuO, copper(II) acetate or copper(II) stearate.

The copper compounds are commercially available, or the preparation thereof is known to those skilled in the art. The copper compound can be used as such or in the form of concentrates. A concentrate is understood to mean a polymer, preferably of the same chemical nature as component A), which comprises the copper salt in high concentration. The use of concentrates is a standard method and is employed particularly frequently when very small amounts of a feedstock have to be metered in. Advantageously, the copper compounds are used in combination with further metal halides, especially alkali metal halides, such as NaI, KI, NaBr, KBr, in which case the molar ratio of metal halide to copper halide is 0.5 to 20, preferably 1 to 10 and more preferably 3 to 7.

Particularly preferred examples of stabilizers which are based on secondary aromatic amines and are usable in accordance with the invention are adducts of phenylenediamine with acetone (Naugard A), adducts of phenylenediamine with linolenic acid, 4,4'-bis(α,α-dimethylbenzyl)diphenylamine (Naugard ® 445), N,N'-dinaphthyl-p-phenylenediamine, N-phenyl-N'-cyclohexyl-p-phenylenediamine or mixtures of two or more thereof.

Preferred examples of stabilizers which are based on sterically hindered phenols and are usable in accordance with the invention are N,N'-hexamethylenebis-3-(3,5-di-tert-butyl-4-hydroxyphenyl)propionamide, bis(3,3-bis(4'-hydroxy-3'-tert-butylphenyl)butanoic acid) glycol ester, 2,1'-thioethyl bis(3-(3,5-di-tert-butyl-4-hydroxyphenyl)propionate, 4,4'-butylidenebis(3-methyl-6-tert-butylphenol), triethylene glycol 3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, diisodecyloxy pentaerythrityl diphosphite, bis(2,4-di-tert-butyl-6-methylphenyl) pentaerythrityl diphosphite, bis(2,4,6-tris(tert-butylphenyl)) pentaerythrityl diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo-[d,g]-1,3,2-dioxaphosphocin, 6-fluoro-2,4,8,10-tetra-tert-butyl-12-methyldibenzo-[d,g]-1,3,2-dioxaphosphocin, bis(2,4-di-tert-butyl-6-methylphenyl)methyl phosphite and bis(2,4-di-tent-butyl-6-methylphenyl) ethyl phosphite. More particularly, preference is given to tris[2-tert-butyl-4-thio(2'-methyl-4'-hydroxy-5'-tert-butyl)phenyl-5-methyl]phenyl phosphite and tris(2,4-di-tert-butylphenyl) phosphite (Hostanox® PAR24: commercial product from BASF SE).

A preferred embodiment of the heat stabilizer consists in the combination of organic heat stabilizers (especially Hostanox PAR 24 and Irganox 1010), a bisphenol A-based epoxide (especially Epikote 1001) and copper stabilization based on CuI and KI. An example of a commercially available stabilizer mixture consisting of organic stabilizers and epoxides is Irgatec NC66 from BASF SE. More particularly, preference is given to heat stabilization exclusively based on CuI and KI. Aside from the addition of copper or copper compounds, the use of further transition metal compounds, especially metal salts or metal oxides of group VB, VIB, VIIB or VIIIB of the Periodic Table, is ruled out. In addition, it is preferable not to add any transition metals of group VB, VIB, VIIB or VIIIB of the Periodic Table, for example iron powder or steel powder, to the inventive molding composition.

The inventive molding compositions comprise preferably 0 to 30% by weight, more preferably 0 to 20% by weight, based on the total weight of components A) to C), of at least one flame retardant as additive C). When the inventive molding compositions comprise at least one flame retardant, they preferably do so in an amount of 0.01 to 30% by weight, more preferably of 0.1 to 20% by weight, based on the total weight of components A) to C). Useful flame retardants C) include halogenated and halogen-free flame retardants and synergists thereof (see also Gächter/Müller, 3rd edition 1989 Hanser Verlag, chapter 11). Preferred halogen-free flame retardants are red phosphorus, phosphinic or diphosphinic salts and/or nitrogen-containing flame retardants such as melamine, melamine cyanurate, melamine sulfate, melamine borate, melamine oxalate, melamine phosphate (primary, secondary) or secondary melamine pyrophosphate, neopentyl glycol boric acid melamine, guanidine and derivatives thereof known to those skilled in the art, and also polymeric melamine phosphate (CAS No.: 56386-64-2 or 218768-84-4, and also EP 1095030), ammonium polyphosphate, trishydroxyethyl isocyanurate (optionally also ammonium polyphosphate in a mixture with trishydroxyethyl isocyanurate) (EP 584567). Further N-containing or P-containing flame retardants, or PN condensates suitable as flame retardants, can be found in DE 10 2004 049 342, as can the synergists likewise customary for this purpose, such as oxides or borates. Suitable halogenated flame retardants are, for example, oligomeric brominated polycarbonates (BC 52 Great Lakes) or polypentabromobenzyl acrylates with N greater than 4 (FR 1025 Dead sea bromine), reaction products of tetrabromobisphenol A with epoxides, brominated oligomeric or polymeric styrenes, Dechlorane, which are usually used with antimony oxides as synergists (for details and further flame retardants see DE-A-10 2004 050 025).

The antistats used in the inventive molding compositions may, for example, be carbon black and/or carbon nanotubes. The use of carbon black may also serve to improve the black color of the molding composition. However, the molding composition may also be free of metallic pigments.

Molding

The present invention further relates to moldings which are produced using the inventive copolyamides or polyamide molding compositions.

The inventive semiaromatic polyamides are advantageously suitable for use for production of moldings for electrical and electronic components and for high-temperature automotive applications.

A specific embodiment is that of moldings in the form of or as part of a component for the automotive sector, especially selected from cylinder head covers, engine hoods, housings for charge air coolers, charge air cooler valves, intake pipes, intake manifolds, connectors, gears, fan impellers, cooling water tanks, housings or housing parts for heat exchangers, coolant coolers, charge air coolers, thermostats, water pumps, heating elements, securing parts.

A further specific embodiment is that of moldings as or as part of an electrical or electronic passive or active component of a printed circuit board, of part of a printed circuit board, of a housing constituent, of a film, or of a wire, more particularly in the form of or as part of a switch, of a plug, of a bushing, of a distributor, of a relay, of a resistor, of a capacitor, of a winding or of a winding body, of a lamp, of a diode, of an LED, of a transistor, of a connector, of a regulator, of an integrated circuit (IC), of a processor, of a controller, of a memory element and/or of a sensor.

The inventive semiaromatic polyamides are additionally specifically suitable for use in soldering operations under lead-free conditions (lead free soldering), for production of plug connectors, microswitches, microbuttons and semiconductor components, especially reflector housings of light-emitting diodes (LEDs).

A specific embodiment is that of moldings as securing elements for electrical or electronic components, such as spacers, bolts, fillets, push-in guides, screws and nuts.

Especially preferred is a molding in the form of or as part of a socket, of a plug connector, of a plug or of a bushing. The molding preferably includes functional elements which require mechanical toughness. Examples of such functional elements are film hinges, snap-in hooks and spring tongues.

Possible uses in automobile interiors are for dashboards, steering-column switches, seat components, headrests, center consoles, gearbox components and door modules, and possible uses in automobile exteriors are for door handles, exterior mirror components, windshield wiper components, windshield wiper protective housings, grilles, roof rails, sunroof frames, engine covers, cylinder head covers, intake pipes, windshield wipers, and exterior bodywork parts.

Possible uses of polyamides with improved flow for the kitchen and household sector are for production of components for kitchen machines, for example fryers, smoothing irons, knobs, and also applications in the garden and leisure sector, for example components for irrigation systems or garden equipment and door handles.

EXAMPLES

General description of the apparatus used (examples 1-3): A 20 L jacketed stirred tank (stainless steel) is initially charged with the amine component in aqueous solution, and the acid components and the catalyst, regulator and other feedstocks are added and rinsed in with demineralized water, and the tank is inertized by injecting nitrogen three times.

The reaction mixture is heated up to 140° C., in the course of which a pressure of about 4 bar is established, and kept stirring until a clear monomer solution is obtained (about 90 minutes). Subsequently, the monomer solution is transferred, while maintaining the pressure and temperature, into a reservoir vessel suitable for the continuous supply of the process. The monomer solution is pumped continuously by means of a pump into a heat exchanger reactor (OS1) consisting of a 3-part shell and tube reactor having 13 tubes each of length 0.6 m and internal diameter 13 mm. The pump output is adjusted such that the desired residence time in the shell and tube reactor is attained at the specified temperature and pressure. The shell and tube reactor has two heating zones which can each be heated separately by means of a heat exchanger. The shell and tube reactor is connected to a 2 L jacket-heated pressure reactor (OS2) equipped with a pressure regulating valve and a base outlet. The heating of the pressure reactor is adjusted such that the desired internal temperature is attained. The desired pressure is established by means of a pressure valve. In order to prevent excessive cooling of the solution as a result of the evaporation of water, heat can additionally be supplied to the reaction solution via an additional heat exchanger upstream of the reactor. The clear oligomer solution is discharged continuously via the base outlet; the discharge rate should be chosen such that the desired residence time is achieved.

Example 1

PA6T/6I—Isolation in solid form with subsequent solid-phase condensation: Feedstocks:
4.943 kg of terephthalic acid
2.118 kg of isophthalic acid
7.268 kg of hexamethylenediamine (70% aqueous solution)
3.026 kg of demineralized water
4.0 g of sodium hypophosphite
30.0 g of acetic acid
OS: oligomerization section:

| OS1 | t1 | p1 | OS2 | t2 | p2 |
|---|---|---|---|---|---|
| 240° C. | 1.5 h | 3.5 MPa | 243° C. | 30 min | 2.7 MPa |

The discharge of the oligomer solution is effected continuously by decompression of the oligomer solution from the pressure reactor via a pressure valve and spray nozzle into a suitable inertized vessel, wherein the oligomers are obtained in solid form and the steam obtained is removed. The solids are subsequently heat-treated under steam at 260° C. in an autoclave for 6 hours in order to obtain the inventive polymer.

Characterization:
Oligomer: GPC (calibration with PMMA standards): Mn: 1050 g/mol, PDI: 1.7
Polymer: GPC (calibration with PMMA standards): Mn: 13 400 g/mol, PDI: 3.2

Example 2

PA6I/6T—Molten transfer into a further condensation step:
4.119 kg of isophthalic acid
1.765 kg of terephthalic acid
6.233 kg of hexamethylenediamine (70% aqueous solution)
2.522 kg of demineralized water
3.25 g of sodium hypophosphite

| OS1-1, OS1-2 | t1 | p1 | OS2 | t2 | p2 |
|---|---|---|---|---|---|
| 230° C., 240° C. | 2 h | 3.5 MPa | 240° C. | 40 min | 2.8 MPa |

The aqueous oligomer solution is subsequently heated directly to a temperature of 320° C. by means of a heat exchanger at a pressure of 20 bar and decompressed directly to 6 bar for removal of the resultant steam in a separator at 315° C. After a further polymerization time of about 10 minutes in the separator, the polymer is discharged.

Characterization:
Oligomer: GPC (calibration with PMMA standards): Mn: 950 g/mol, PDI: 1.8
Polymer: GPC (calibration with PMMA standards): Mn: 16 200 g/mol, PDI: 2.5

Example 3

PA66—Molten transfer into a further condensation step
10.500 kg of AH salt (pH 7.71)
4.556 kg of water
3.5 g of sodium hypophosphite

| OS1 | t1 | p1 | OS2 | t2 | p2 |
|---|---|---|---|---|---|
| 250° C. | 1 h | 4.0 MPa | 240° C. | 20 min | 2.7 MPa |

The aqueous oligomer solution is subsequently heated directly to a temperature of 300° C. by means of a heat exchanger at a pressure of 30 bar and decompressed to 5 bar for removal of the resultant steam in a separator at 295° C. After a further polymerization time of about 18 minutes in the separator, the polymer is discharged.

Characterization:
Oligomer: GPC (calibration with PMMA standards): Mn: 890 g/mol, PDI: 1.7
Polymer: GPC (calibration with PMMA standards): Mn: 16 300 g/mol, PDI: 2.5

The invention claimed is:

1. A process for continuously preparing polyamide oligomers, comprising
continuously conveying an aqueous solution of water and polyamide-forming monomers from a reservoir vessel into an oligomerization reactor, wherein the aqueous solution has a water content in a range from 5 wt. % to 95 wt. % based on the water and the polyamide-forming monomers combined,
heating the aqueous solution beyond a dissolution or storage temperature, a residence time of the monomer solution in the oligomerization reactor being limited and a pressure or partial vapor pressure of the water being adjusted such that a conversion of monomers to polyamide oligomers does not exceed a maximum value and the polyamide oligomers formed do not phase-separate or spontaneously crystallize in solid form, and
continuously discharging an aqueous solution of the polyamide oligomers from the oligomerization reactor;
wherein:
during a first mean residence time t1 of the aqueous solution in the oligomerization reactor the temperature of the reaction mixture approaches and/or attains a first oligomerization temperature OT1 and the pressure or the partial steam pressure in the oligomerization reactor approaches or is a first pressure p1,
during a second mean residence time t2 thereafter the temperature of the aqueous solution approaches or attains a second oligomerization temperature OT2 and the pressure or the partial steam pressure in the oligomerization reactor approaches or is a second pressure p2,
the first mean residence time t1 is greater than or equal to the second mean residence time t2 and the first oligomerization temperature OT1 is less than the second oligomerization temperature OT2,
the first oligomerization temperature OT1 is within a range from 225° C. to 255° C., and
the second mean residence time t2 is at least 10 minutes.

2. The process according to claim 1, wherein polyamides in the case of exclusive hydrolytic cleavage of the amide groups provides a composition of the following formula (I)

in which
A1 denotes units which derive from an unsubstituted or substituted monocarboxylic acid or derivative thereof,
A2 denotes units which derive from an unsubstituted or substituted dicarboxylic acid or derivative thereof,
AX denotes units which derive from a compound having a carboxyl functionality greater than two,
B1 denotes units which derive from a monofunctional amine,
B2 denotes units which derive from a diamine,
B3 denotes units which derive from a triamine,
BY denotes units which derive from a compound having an amino functionality greater than three,
AB denotes units which derive from an aminocarboxylic acid,
A2B denotes units which derive from an aminodicarboxylic acid,
AXBY denotes units which derive from a compound having amino and carboxyl groups where the functionalities X+Y are greater than 2,
with the proviso that the sum of all indices a1+b1+a2+b2+b3+ax+by+ab+a2b+axby adds up to 100 mol %.

3. The process according to claim 1, wherein the polyamide-forming monomers are selected from the group consisting of A) unsubstituted or substituted aromatic dicarboxylic acids and derivatives of unsubstituted or substituted aromatic dicarboxylic acids,
B) unsubstituted or substituted aromatic diamines,
C) aliphatic or cycloaliphatic dicarboxylic acids,
D) aliphatic or cycloaliphatic diamines,
E) monocarboxylic acids,
F) monoamines,
G) at least trifunctional amines,
H) lactams,
I) ω-amino acids, and
K) compounds which are different than A) to I) and are cocondensable therewith, and mixtures thereof.

4. The process according to claim 3, wherein at least one of components A) and B) is present for provision of the aqueous composition in step a).

5. The process according to claim 3, wherein the aromatic dicarboxylic acid A) is terephthalic acid, isophthalic acid, or a mixture of terephthalic acid and isophthalic acid.

6. The process according to claim 1, wherein the polyamide is selected from the group consisting of PA 6.T, PA 9.T, PA8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T,PA 10.T/IPDA.T, PA 12.T/IPDA.T and copolymers and mixtures thereof.

7. The process according to claim 1, wherein the first pressure p1 corresponds to the saturation vapor pressure of water at the first oligomerization temperature OT1 and the second pressure p2 is below the saturation vapor pressure of water at the second oligomerization temperature OT2.

8. The process according to claim 1, wherein the first mean residence time t1 is 0 min to 240 min.

9. The process according to claim 1, wherein the first pressure p1 is 1.5 MPa to 5.0 MPa.

10. The process according to claim 1, wherein the second oligomerization temperature OT2 is 240° C. to 300° C.

11. The process according to claim 1, wherein the second mean residence time t2 is 20 minutes to 50 minutes.

12. The process according to claim 1, wherein the pressure p2 is 1.9 MPa to 5.0 MPa.

13. A polyamide oligomer prepared by the process according to claim 1.

14. A process for preparing a semicrystalline or amorphous, thermoplastically processible polyamide, comprising continuously providing a mixture comprising water and a polyamide oligomer according to claim 13, and postcondensing the polyamide oligomer to give a polyamide.

15. A polyamide prepared by the process according to claim 14.

16. A method for the production of films, monofilaments, fibers, yarns or textile fabrics comprising the use of an aliphatic polyamide according to claim 15.

17. A method for the production of electrical and electronic components and for high-temperature automotive applications comprising use of a semiaromatic polyamide according to claim 15.

18. The method according to claim 17 for use in soldering operations under lead-free conditions and, for production of plug connectors, microswitches, microbuttons, semiconductor components, and reflector housings of light-emitting diodes.

19. The process according to claim 1, further comprising, prior to continuously conveying of an aqueous solution of polyamide-forming monomers from a reservoir vessel into an oligomerization reactor:
combining at least one dicarboxylic acid, at least one diamine, and water to form the aqueous solution of polyamide-forming monomers.

20. The process according to claim 1, wherein the second mean residence time t2 is at least 20 minutes.

21. The process according to claim 1, wherein the second mean residence time t2 is 20 minutes to 60 minutes.

22. The process according to claim 1, wherein conversion of monomers to polyamide oligomers in the oligomerization reaction does not exceed a maximum value and sufficient water is retained in the oligomerization reactor such that the polyamide oligomers formed do not phase-separate and do not spontaneously crystallize in solid form.

23. The process according to claim 1, wherein the aqueous solution has a water content in a range from 15 wt. % to 55 wt. % based on the water and the polyamide-forming monomers combined.

24. The process according to claim 1, wherein the aqueous solution has a water content in a range from 20 wt. % to 30 wt. % based on the water and the polyamide-forming monomers combined.

* * * * *